(12) United States Patent
Chien et al.

(10) Patent No.: US 10,101,165 B2
(45) Date of Patent: Oct. 16, 2018

(54) ELECTRONIC DEVICE AND METHOD FOR PLANNING TOUR ROUTE

(71) Applicant: Chiun Mai Communication Systems, Inc., New Taipei (TW)

(72) Inventors: How-Wen Chien, New Taipei (TW); Sung-Chieh Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 116 days.

(21) Appl. No.: 15/047,100

(22) Filed: Feb. 18, 2016

(65) Prior Publication Data

US 2017/0131109 A1    May 11, 2017

(30) Foreign Application Priority Data

Nov. 10, 2015  (CN) .......................... 2015 1 0762666

(51) Int. Cl.
| | |
|---|---|
| *H04N 7/18* | (2006.01) |
| *G01C 21/34* | (2006.01) |
| *G06F 17/30* | (2006.01) |

(52) U.S. Cl.
CPC ..... *G01C 21/343* (2013.01); *G06F 17/30241* (2013.01); *G06F 17/30268* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 2011/0115943 A1* | 5/2011 | Sassa | ................ | G06F 17/30247 348/231.5 |
| 2011/0285872 A1* | 11/2011 | Shiokawa | ........... | G06F 17/3028 348/231.5 |
| 2013/0332068 A1* | 12/2013 | Kesar | .................... | H04W 4/185 701/430 |
| 2015/0178561 A1* | 6/2015 | Hensel | ............... | G01C 21/3647 382/112 |
| 2016/0258767 A1* | 9/2016 | Nevrekar | ............. | G01C 21/343 |

FOREIGN PATENT DOCUMENTS

TW          201405346 A      2/2014

* cited by examiner

*Primary Examiner* — Eileen M Adams
(74) *Attorney, Agent, or Firm* — ScienBiziP, P.C.

(57) ABSTRACT

A method for planning a tour route includes obtaining photos whose captured positions belong to one or more designated places. A first group of photos from the obtained photos are determined, wherein each of the first group of photos corresponds to a scenic spot. The tour route is planned by sorting the first group of photos according to a preset sorting method, and related information of the tour route is generated.

18 Claims, 5 Drawing Sheets

ELECTRONIC DEVICE AND METHOD FOR PLANNING TOUR ROUTE

CROSS-REFERENCE TO RELATED APPLICATIONS

This application claims priority to Chinese Patent Application No. 201510762666.5 filed on Nov. 10, 2015, the contents of which are incorporated by reference herein.

FIELD

The subject matter herein generally relates to planning technology, and particularly to an electronic device and a method for planning a tour route using the electronic device.

BACKGROUND

Generally, individual visitors set their itinerary through a travel agency. However, it may cost a lot, and not that freely during the travel.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
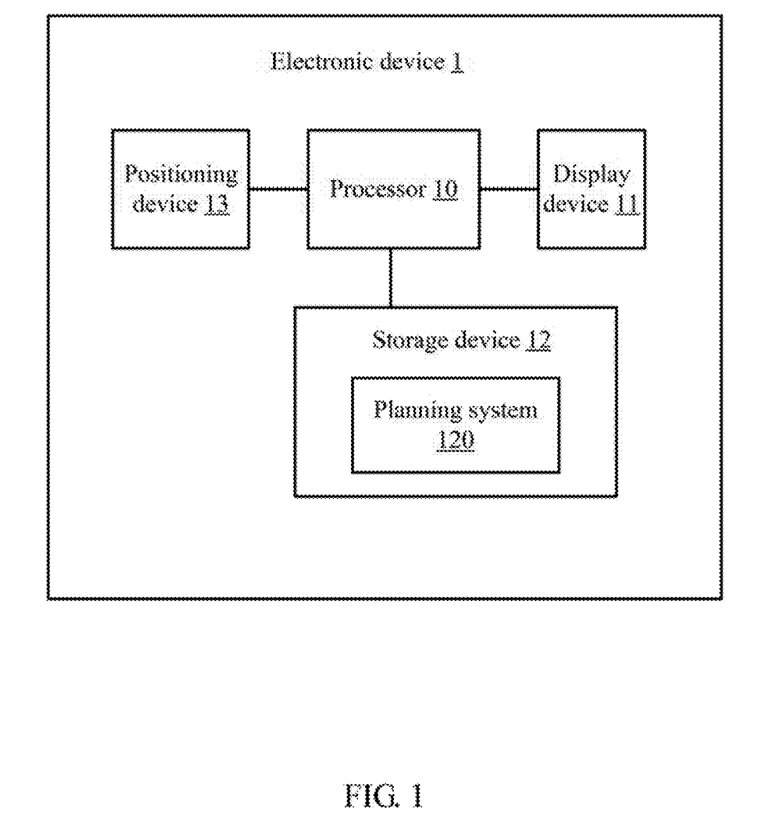
FIG. 1 is a block diagram of one embodiment of an electronic device.

FIG. 1 is a block diagram of one embodiment of an electronic device.

Depending on the embodiment, an electronic device 1 may include, but is not limited to, at least one processor 10, a display device 11, a storage device 12, and a positioning device 13. The above components are electrically connected to each other. The electronic device 1 can be a smart phone, a personal digital assistant (PDA), a computer, or any other suitable electronic device. FIG. 1 illustrates only one example of the electronic device 1 that can include more or fewer components than illustrated, or have a different configuration of the various components in other embodiments.

The at least one processor 11 can be a central processing unit (CPU), a microprocessor, or other data processor chip that performs functions of the electronic device 1. The display device 11 can provide an interface for interaction between a user and the electronic device 1. The display device 11 can be a touch screen that can be used to display various kinds of information of the electronic device 1.

The storage device 12 can store all the feature points. In at least one embodiment, the storage device 12 can be an internal storage device, such as a flash memory, a random access memory (RAM) for temporary storage of information, and/or a read-only memory (ROM) for permanent storage of information. The storage device 12 can also be an external storage device, such as a smart media card, a secure digital card, and/or a flash card.

The positioning device 13 can be used to detect a position data of the electronic device 1. In at least one embodiment, the position data can be data of longitude and latitude. In at least one embodiment, the positioning device 13 can be a Global Positioning System (GPS), an Assisted Global Positioning System (AGPS), a BeiDou Navigation Satellite System (BDS), or a Global Navigation Satellite System (GLONASS).

Figure 2:
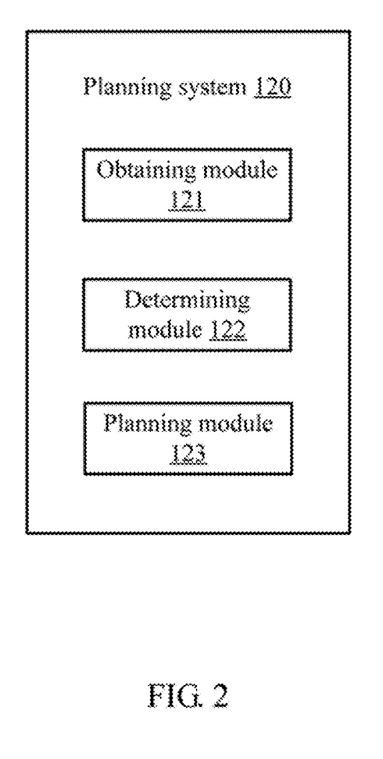
FIG. 2 is a block diagram of one embodiment of modules of a planning system installed in the electronic device of FIG. 1.

In at least one embodiment, as illustrated in FIG. 2, the planning system 120 can be installed in the electronic device 1. The planning system 120 can include an obtaining module 121, a determining module 122, and a planning module 123. The modules 121-123 can include computerized codes in form of one or more programs, which are stored in the storage device 12, and are executed by the at least one processor 10. Details will be provided in conjunction with a flow chart of FIG. 3 in the following paragraphs.

Figure 3:
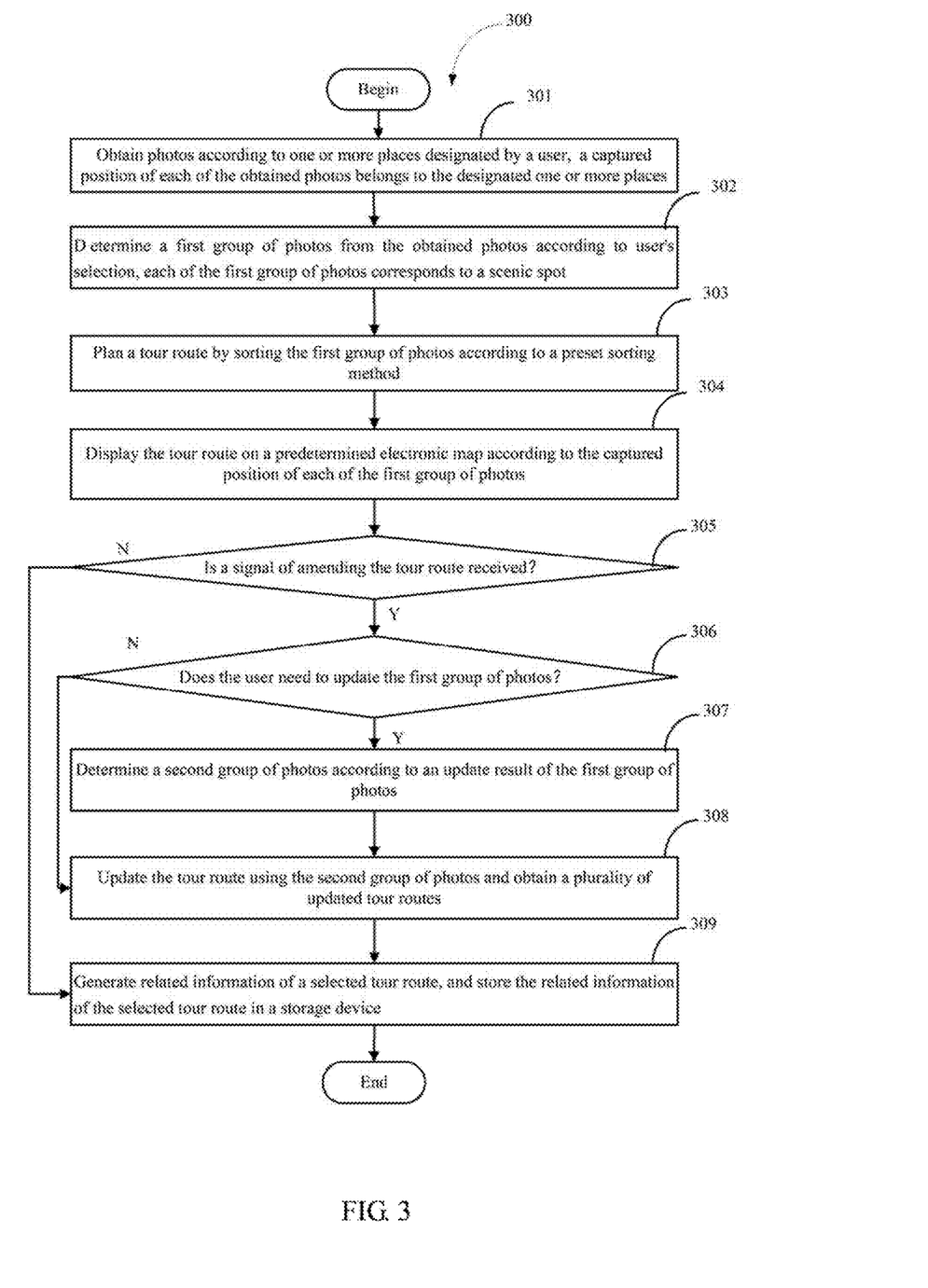
FIG. 3 illustrates a flow chart of one embodiment of a method for planning a tour route.

FIG. 3 illustrates a flowchart of one embodiment of locking the electronic device 1. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods or subroutines, carried out in the exemplary method 300. Additionally, the illustrated order of blocks is by example only and the order of the blocks can be changed according to the present disclosure. The exemplary method 300 can begin at block 301. Depending on the embodiment, additional steps can be added, others removed, and the ordering of the steps can be changed.

At block 301, the obtaining module 121 can obtain photos according to one or more places designated by a user. A captured position of each of the obtained photos belongs to the designated one or more places.

In at least one embodiment, the obtaining module 121 can determine the one or more places to be tour destinations for planning a tour route.

In at least one embodiment, the captured position can be a latitude and longitude where a photo is captured. The obtaining module 121 can obtain the photos whose captured positions belong to the designated one or more places by searching a predetermined database or the Internet. In at least one embodiment, the predetermined database pre-stores photos of one or more scenic spots. The predetermined database can be an internal storage device of the electronic device 1, or an external storage device that communicates with the electronic device 1.

For example, it is assumed that the designated one or more places include "Beijing", then the obtaining module 121 obtains the photos whose captured positions belong to the range of latitudes and longitudes of "Beijing".

In another example, it is assumed that the designated one or more places further include "Tianjing", then the obtaining module 121 obtains the photos whose captured positions belong to the range of latitudes and longitudes of "Tianjing".

In at least one embodiment, the obtaining module 121 can also determine a current position of the electronic device 1 to be a tour destination. In other embodiments, the obtaining module 121 can determine both the current position of the electronic device 1 and the designated one or more places to be the tour destinations.

In at least one embodiment, the obtaining module 121 can obtain a current latitude and longitude of the electronic device 1 using the positioning device 13. The obtaining module 121 can determine in which place the electronic device 1 is currently located, according to the current latitude and longitude of the electronic device 1. Then, the obtaining module 121 can obtain photos whose captured positions belong to the place in which the electronic device 1 is currently located, from the predetermined database or the Internet.

The obtaining module 121 can control the display device 11 to display the obtained photos for the user to choose.

At block 302, the determining module 122 can determine a first group of photos from the obtained photos according to user's selection. The first group of photos are used for planning a tour route. In at least one embodiment, each of the first group of photos corresponds to a scenic spot.

For example, it is assumed that the obtaining module 121 obtains six photos at block 301, the six photos respectively correspond to scenic spots "A", "B", "C", "D", "E", and "F". If the user does not want to visit the scenic spots "E" and "F", the user can delete the photos respectively correspond to the scenic spots "E" and "F". The obtaining module 121 can determine other photos that are not deleted to be the first group of photos.

At block 303, the planning module 123 can plan the tour route by sorting the first group of photos according to a preset sorting method.

In at least one embodiment, the preset sorting method can be any one of the following four sorting methods.

In at least one embodiment, the four sorting methods include a first sorting method that the planning module 123 sorts the first group of photos according to the captured position of each of the first group of photos.

The four sorting methods further include a second sorting method that the planning module 123 sorts the first group of photos according to captured time of each of the first group of photos. The captured time is the moment when a photo is captured.

The four sorting methods further include a third sorting method that the planning module 123 first sorts the first group of photos according to the captured position of each of the first group of photos, then sorts photos of the first group whose captured positions are the same according to captured time.

The four sorting methods further include a fourth sorting method that the planning module 123 first sorts the first group of photos according to the captured time of each of the first group of photos, then sorts photos of the first group whose captured time are the same according to captured positions.

In at least one embodiment, the captured time and captured position are obtained from exchangeable image file format (EXIF) information of each of the first group of photos. In at least one embodiment, the captured time can include six parts. The six parts can be the "year", "month", "date", "hour", "minute", and "second" of the captured time. The planning module 123 can sort the first group of photos according to one or more parts of the captured times of the first group of photos.

In at least one embodiment, the planning module 123 can sort the first group of photos according to three parts of the captured time. The three parts can be the "hour", "minute", and "second" of the captured time based on a 24-hour time system. In other words, the planning module 123 can sort the first group of photos according to a 24-hour time system of the captured time. The best time for visiting a scenic spot is the captured time of the photo corresponding to that scenic spot. The first group of photos can be sorted according to the 24-hour captured time, to obtain a tour route of successively visiting the corresponding scenic spots in order of the 24-hour captured time, for the convenience of the user to visit each of the scenic spots corresponding to the first group of photos at the best time. For example, if the 24-hour captured time of the photo corresponding to the scenic spot "A" is at sunset, then the best time for visiting the scenic spot "A" is at sunset and the visit time of the scenic spot "A" in the tour rout can be arranged to be at sunset.

For example, the planning module 123 can obtain a tour route of successively visiting scenic spots "A", "B", "C", "D" by sorting the first group of photos according to the second sorting method.

At block 304, the planning module 123 can display the tour route on a predetermined electronic map according to the captured position of each of the first group of photos.

Figure 4:
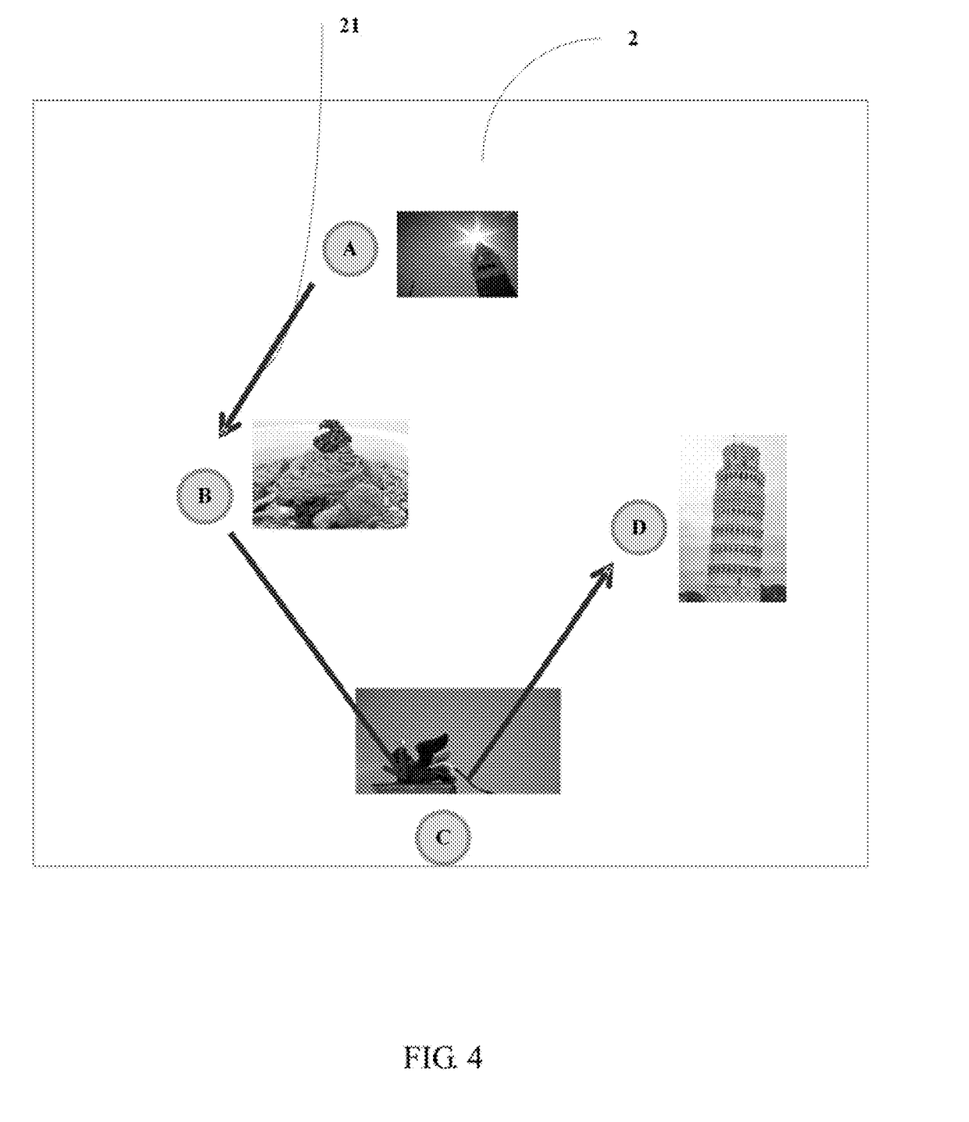
FIG. 4 illustrates an example of a tour route.

For example, as shown in FIG. 4, the planning module 123 can display a tour route 21 of successively visiting the scenic spots "A", "B", "C", "D", according to the captured position of each of the first group of photos.

In at least one embodiment, to convenient the user to determine whether there is a need in amending the tour route, the planning module 123 can further determine a season corresponding to the captured time of each of the first group of photos, according to the parts "year", "month", and "date". The planning module 123 can further prompt the user with the determined season corresponding to each of the first group of photos on the predetermined electronic map. In at least one embodiment, the planning module 123 can further determine a period of time corresponding to the captured time of each of the first group of photos, according to the parts "hour", "minute", and "second". The planning module 123 can further prompt the user with the determined period of time corresponding to each of the first group of photos on the predetermined electronic map.

For example, it is assumed that a photo that is corresponding to the scenic spot "D" is captured on 2014-2-24 18:30:25 pm, the planning module 123 can prompt the user by displaying a message "captured at 6-7 pm in Spring" at the scenic spot "D" on the predetermined electronic map.

In other embodiments, the planning module 123 can further determine a distance value between each two adjacent scenic spots of the tour route, according to captured positions of photos corresponding to the each two adjacent scenic spots. The planning module 123 can further display the determined distance value between the each two adjacent scenic spots on the predetermined electronic map.

At block 305, the planning module 123 can determine whether a signal of amending the tour route is received. If the signal is received, the process goes to block 306. If the signal is not received, the process goes to block 309.

In at least one embodiment, the planning module 123 can determine the signal is received when a preset operation is detected on the display device 11. The preset operation can be defined as the user clicking a preset icon displayed on the display device 11, or the user touching one of the scenic spots of the tour route displayed on the predetermined electronic map for a predetermined time length. In at least one embodiment, the predetermined time length can be 2 seconds or 5 seconds.

At block 306, the planning module 123 can determine whether the user needs to update the first group of photos. When the user needs to update the first group photos, the process goes to block 307. When the user does not need to update the first group photos, the process goes to block 308.

In at least one embodiment, the user can update the first group of photos by deleting one or more photos from the first group of photos, or adding one or more photos into the first group of photos.

In at least one embodiment, the planning module 123 can display a dialog box on the display device 11 to ask the user whether to update the first group of photos or not.

At block 307, the planning module 123 can determine a second group of photos according to an update result of the first group of photos. The second group of photos is used for updating the tour route.

In at least one embodiment, the planning module 123 can re-display the photos obtained at block 301 on the display device 11 for the user to choose photos and add the chosen photos into the first group of photos. In other embodiments, the planning module 123 can display photos searched from the predetermined database or the Internet according to a place currently designated by the user on the display device 11 for the user to choose photos and add the chosen photos into the first group of photos.

At block 308, the planning module 123 can update the tour route using the second group of photos, and obtain a plurality of updated tour routes. The planning module 123 can further display the updated tour routes on the predetermined electronic map, according to the captured position of each of the second group of photos.

It should be noted that if the user does not select to update the first group of photos at block 306, the second group of photos are the same as the first group of photos.

In at least one embodiment, when the planning module 123 updates the tour route, the planning module 123 first determines a visiting order for at least one scenic spot that is corresponding to one of the second group of photos. The planning module 123 can further make permutation for other scenic spots whose visiting orders have not been determined. In at least one embodiment, the planning module 123 can further determine visit time for at least one scenic spot that is corresponding to one of the second group of photos.

In at least one embodiment, from the scenic spots that are corresponding to the second group of photos, the user can set one of the scenic spots to be a first visit scenic spot, and set visit time for the first visit scenic spot. In another embodiment, the user can set one of the scenic spots to be a last visit scenic spot, and set visit time for the last visit scenic spot. In other embodiments, the user can set the first visit scenic spot and the last visit scenic spot from the scenic spots, and set visit time for the first visit scenic spot and the last visit scenic spot. Then, the planning module 123 can update the tour route by making permutation for the other scenic spots whose visiting orders and visit time have not been determined.

For example, it is assumed that the second group of photos includes photos respectively corresponding to scenic spots "A", "B", "C", "D". If the user decides to first visit the scenic spot "A", and last visit the scenic spot "D", then the user can set the scenic spot "A" to be the first visit scenic spot, and set the scenic spot "D" to be the last visit scenic spot. The planning module 123 can make permutation for the other scenic spots "B" and "C" whose visiting orders have not been determined, then the planning module 123 can obtain two different tour routes. The two different tour routes includes a first tour route of successively visiting the scenic spots "A", "B", "C", "D", and a second tour route of successively visiting the scenic spots "A", "C", "B", "D".

In another embodiment, from the scenic spots that are corresponding to the second group of photos, the user can set more than one scenic spots to be visit successively, the planning module 123 can set the photos corresponding to the more than one scenic spots as a whole. The planning module 123 can further make permutation for the whole and the other photos corresponding to the scenic spots whose visiting order have not been determined, wherein the order of each of the photos in the whole is not changed.

For example, it is assumed that the user sets successively visiting scenic spots "D", "A", the planning module 123 can set the photos corresponding to the scenic spots "D", "A" as a whole. Then the planning module 123 can obtain six tour routes by making permutation for the whole and the other photos corresponding to the scenic spots "B", "C" whose visiting orders have not been determined. The six tour routes include successively visiting scenic spots "B", "C", "D", "A", successively visiting scenic spots "C", "B", "D", "A", successively visiting scenic spots "B", "D", "A", "C", successively visiting scenic spots "C", "D", "A", "B", successively visiting scenic spots "D", "A", "B", "C", and successively visiting scenic spots "D", "A", "C", "B". The order of the photos corresponding to the scenic spots "D", "A" is not changed in the six tour routes.

In at least one embodiment, the planning module 123 can further obtain additional photos corresponding to additional scenic spots according to user's requirement. The planning module 123 can further display the additional photos on the display device 11 for the user to choose. The user can choose one or more additional photos. The planning module 123 can add the chosen one or more additional photos in the second group of photos. The planning module 123 can add scenic spots corresponding to the chosen one or more additional photos into the plurality of updated tour routes.

The additional photos can be defined as photos whose captured positions are within a predetermined distance range from a captured position of one of the second group of photos, wherein the one of the second group of photos is designated by the user.

In at least one embodiment, the captured position of the one of the second group of photos can be defined as a centre. The predetermined distance range can be a distance range within a 1-km radius based on the centre.

In other embodiments, the predetermined distance range can be defined as a distance range that can be reached by walk or by a vehicle in a predetermined time period, starting from the captured position of the one of the second group of photos.

Figure 5:
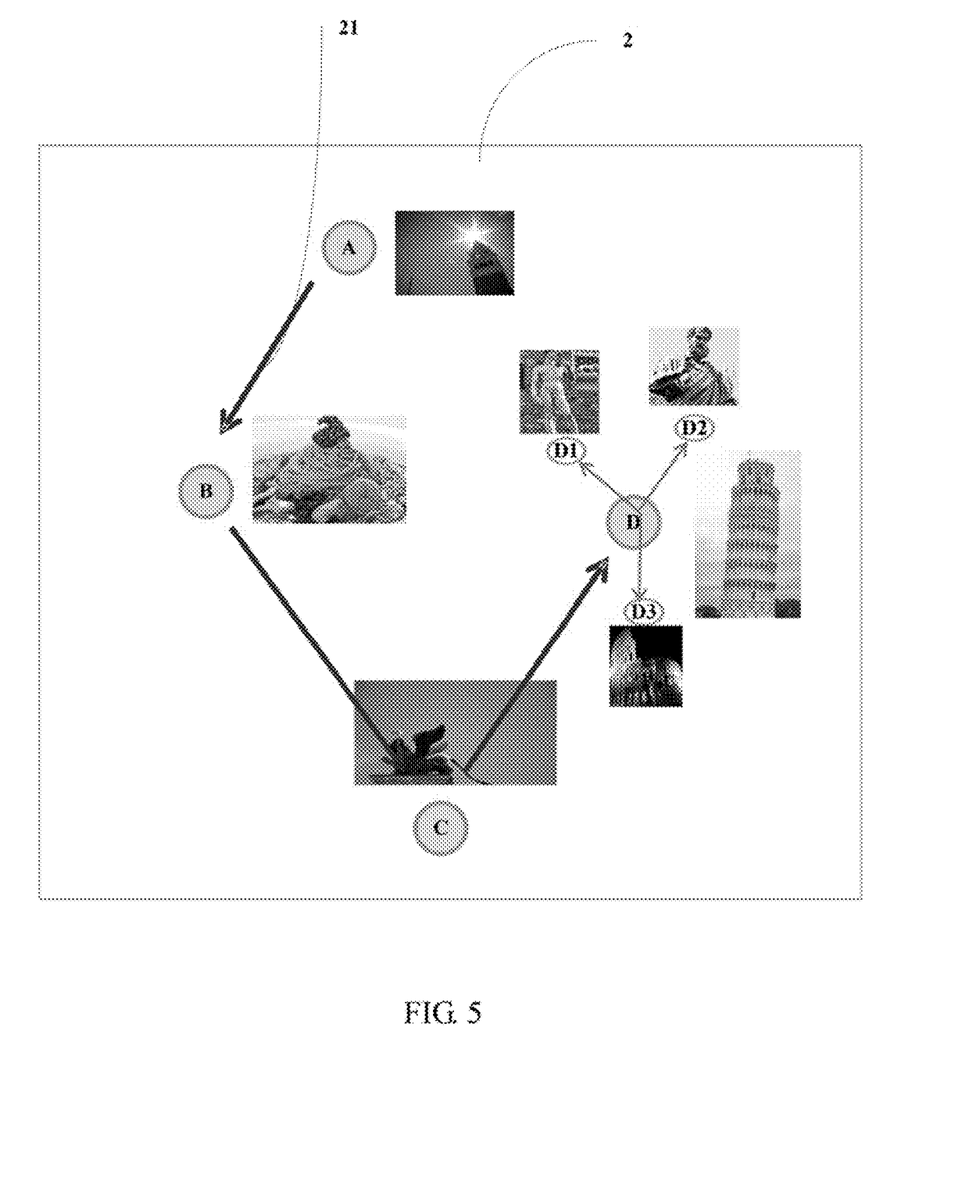
FIG. 5 illustrates another example of a tour route.

For example, as shown in FIG. 5, it is assumed that the user chooses adding additional scenic spots at the scenic spot "D" of the tour route 21. The planning module 123 obtains additional photos corresponding to additional scenic spots "D1", "D2", "D3" whose captured positions are within the predetermined distance range such as 1 kilometer. The planning module 123 displays the additional photos corresponding to additional scenic spots "D1", "D2", "D3" around the scenic spot "D".

In at least one embodiment, the planning module 123 can make permutation for the additional photos that are chose by the user. The planning module 123 can further add scenic spots corresponding to the additional photos in the updated tour routes when the additional photos have been made permutation.

For example, it is assumed that the user chooses the additional scenic spots "D1" and "D2", the planning module 123 can make permutation for the scenic spots "D1" and "D2". The planning module 123 can further add the additional scenic spots in the updated tour route when the permutation for the scenic spots "D1" and "D2" have been made, then the planning module 123 can obtain two tour routes, the two tour routes include successively visiting scenic spots "A", "B", "C", "D", "D1", "D2", and successively visiting scenic spots "A", "B", "C", "D", "D2", "D1". As can be seen from the two tour routes including the additional scenic spots, visiting orders for the additional scenic spots "D1", "D2" are after the scenic spot "D", and the visiting orders for the other scenic spots "A", "B", "C" are not changed after the additional scenic spots "D1", "D2" are added.

In another embodiment, the aforementioned additional scenic spots can be hotels and restaurants that are near one of the scenic spots of the plurality of updated tour routes. The planning module 123 can further obtain photos of hotels and restaurants that are near one of the scenic spots of the plurality of updated tour routes according to user's requirement. The planning module 123 can further display the photos of the hotels and restaurants on the predetermined electronic map for the user to choose. The planning module 123 can further make permutation for the chosen photos of the hotels and restaurants, and add the hotels and restaurants in the plurality of updated tour routes.

At block 309, the user can select one of the plurality of updated tour routes. The planning module 123 can further generate related information of the selected tour route. In at least one embodiment, the related information can include, but are not limited to, visiting time of each of the scenic spots of the selected tour route, a distance value between each two adjacent scenic spots of the selected tour route, a traffic route between each two adjacent scenic spots of the selected tour route, and estimated traffic time corresponding to each traffic route. It should be noted that if the visiting time of each of the scenic spots of the selected tour route is not set by the user, the planning module 123 can generate the visiting time according to captured time of photos corresponding to each of the scenic spots of the selected tour route.

The planning module 123 can further store the related information of the selected tour route in the storage device 12 or other storage device such as a cloud storage device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for planning a tour route using an electronic device, the method comprising:
    obtaining photos whose captured positions belong to one or more designated places;
    determining a first group of photos from the obtained photos, wherein each of the first group of photos corresponds to a scenic spot;
    planning the tour route by first sorting the first group of photos according to the captured position of each of the first group of photos, then sorting photos of the first group whose captured positions are same according to captured time; and
    generating related information of the tour route.

2. The method according to claim 1, further comprising:
    displaying the tour route on a predetermined electronic map according to the captured position of each of the first group of photos.

3. The method according to claim 2, further comprising:
    determining a distance value between each two adjacent scenic spots of the tour route, according to captured positions of photos corresponding to the each two adjacent scenic spots; and
    displaying the determined distance value between the each two adjacent scenic spots on the predetermined electronic map.

4. The method according to claim 1, further comprising:
    determining a second group of photos according to an update result of the first group of photos, wherein the second group of photos are used for updating the tour route.

5. The method according to claim 4, further comprising:
    determining a visiting order for at least one scenic spot that is corresponding to one of the second group of photos; and
    making permutation for other scenic spots whose visiting orders have not been determined to update the tour route.

6. The method according to claim 5, further comprising:
    obtaining additional photos corresponding to additional scenic spots; and
    displaying the additional photos on a display device of the electronic device for a user to choose;
    making permutation for the chosen one or more additional photos; and
    adding scenic spots corresponding to the chosen one or more additional photos in the updated the tour route.

7. An electronic device, comprising:

at least one processor; and a storage device that stores one or more programs, when executed by the at least one processor, cause the at least one processor to;

obtain photos whose captured positions belong to one or more designated places;

determine a first group of photos from the obtained photos, wherein each of the first group of photos corresponds to a scenic spot;

plan a tour route by first sorting the first group of photos according to the captured position of each of the first group of photos, then sorting photos of the first group whose captured positions are same according to captured time; and generate related information of the tour route.

8. The electronic device according to claim 7, wherein the at least one processor further caused to:

display the tour route on a predetermined electronic map according to the captured position of each of the first group of photos.

9. The electronic device according to claim 8, wherein the at least one processor further caused to:

determine a distance value between each two adjacent scenic spots of the tour route, according to captured positions of photos corresponding to the each two adjacent scenic spots; and display the determined distance value between the each two adjacent scenic spots on the predetermined electronic map.

10. The electronic device according to claim 7, wherein the at least one processor further caused to:

determine a second group of photos according to an update result of the first group of photos, wherein the second group of photos are used for updating the tour route.

11. The electronic device according to claim 10, wherein the at least one processor further caused to:

determine a visiting order for at least one scenic spot that is corresponding to one of the second group of photos; and make permutation for other scenic spots whose visiting orders have not been determined to update the tour route.

12. The electronic device according to claim 11, wherein the at least one processor further caused to:

obtain additional photos corresponding to additional scenic spots; and display the additional photos on a display device of the electronic device for a user to choose;

make permutation for the chosen one or more additional photos; and add scenic spots corresponding to the chosen one or more additional photos in the updated the tour route.

13. A non-transitory storage medium having stored thereon instructions that, when executed by a processor of an electronic device, causes the processor to perform a method for planning a tour route, wherein the method comprises:

obtaining photos whose captured positions belong to one or more designated places;

determining a first group of photos from the obtained photos, wherein each of the first group of photos corresponds to a scenic spot;

planning the tour route by first sorting the first group of photos according to the captured position of each of the first group of photos, then sorting photos of the first group whose captured positions are same according to captured time; and generating related information of the tour route.

14. The non-transitory storage medium according to claim 13, wherein the method further comprising:

displaying the tour route on a predetermined electronic map according to the captured position of each of the first group of photos.

15. The non-transitory storage medium according to claim 14, wherein the method further comprising:

determining a distance value between each two adjacent scenic spots of the tour route, according to captured positions of photos corresponding to the each two adjacent scenic spots; and displaying the determined distance value between the each two adjacent scenic spots on the predetermined electronic map.

16. The non-transitory storage medium according to claim 13, wherein the method further comprising:

determining a second group of photos according to an update result of the first group of photos, wherein the second group of photos are used for updating the tour route.

17. The non-transitory storage medium according to claim 16, wherein the method further comprising:

determining a visiting order for at least one scenic spot that is corresponding to one of the second group of photos; and making permutation for other scenic spots whose visiting orders have not been determined to update the tour route.

18. The non-transitory storage medium according to claim 17, wherein the method further comprising:

obtaining additional photos corresponding to additional scenic spots; and displaying the additional photos on a display device of the electronic device for a user to choose;

making permutation for the chosen one or more additional photos; and adding scenic spots corresponding to the chosen one or more additional photos in the updated the tour route.

* * * * *